US007681178B1

(12) United States Patent
George et al.

(10) Patent No.: US 7,681,178 B1
(45) Date of Patent: Mar. 16, 2010

(54) CASCADING STYLE SHEETS (CSS) PROTOTYPE POINTER CHAINING IN OBJECT-ORIENTED ENVIRONMENT

(75) Inventors: David George, Redwood City, CA (US); Edwin Smith, Marlborough, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1271 days.

(21) Appl. No.: 11/187,626

(22) Filed: Jul. 22, 2005

(51) Int. Cl.
*G06F 9/44* (2006.01)
*G06F 9/45* (2006.01)

(52) U.S. Cl. .................. 717/117; 717/116; 717/120
(58) Field of Classification Search ............ 717/107, 717/114–121
See application file for complete search history.

(56) References Cited

U.S. PATENT DOCUMENTS

| | | | |
|---|---|---|---|
| 4,989,132 A * | 1/1991 | Mellender et al. ........... 717/139 |
| 5,437,025 A * | 7/1995 | Bale et al. ............... 707/103 R |
| 5,682,535 A * | 10/1997 | Knudsen .................... 717/117 |
| 5,740,440 A * | 4/1998 | West ......................... 717/125 |
| 5,842,212 A * | 11/1998 | Ballurio et al. ............ 707/100 |
| 6,292,933 B1 * | 9/2001 | Bahrs et al. ............... 717/107 |
| 6,701,516 B1 * | 3/2004 | Li ............................... 717/117 |
| 6,748,570 B1 * | 6/2004 | Bahrs et al. ............... 715/210 |
| 6,751,789 B1 * | 6/2004 | Berry et al. ................ 717/130 |
| 6,785,882 B1 * | 8/2004 | Goiffon et al. ............. 717/120 |
| 6,826,745 B2 * | 11/2004 | Coker et al. ................ 717/115 |
| 6,862,711 B1 * | 3/2005 | Bahrs et al. ............... 715/205 |
| 7,039,900 B2 * | 5/2006 | Lecerf ........................ 717/116 |
| 7,065,745 B2 * | 6/2006 | Chan .......................... 717/117 |
| 7,322,025 B2 * | 1/2008 | Reddy et al. ............... 717/121 |
| 7,340,723 B2 * | 3/2008 | Antonov et al. ............ 717/116 |
| 7,480,897 B2 * | 1/2009 | Reinhardt et al. ......... 717/120 |
| 7,565,640 B2 * | 7/2009 | Shukla et al. .............. 717/105 |
| 7,574,692 B2 * | 8/2009 | Herscu ....................... 717/116 |

OTHER PUBLICATIONS

Cacace et al, "Integrating object oriented data modeling with rule based programming paradigm", ACM 225-236, 1990.*
D'Hondt et al, "Hybrid Aspects for weaving object oriented functionality and rule based knowledge", ACM AOSD, pp. 132-140, 2004.*
Czejdo et al, "Permanent object storage and collections for object oriented system with rules" ACM, pp. 369-376, 1992.*
Chang et al, "A framework for multidimensional adaptive subdivision objects", ACM SSMP, pp. 123-134, 2004.*
Larsen, "Rules based object clustring: a data structure for symbolic VLSI synthesis and analysis", IEEE, pp. 768-777, 1986.*
Li et al, "Demonstrational customization of a shared whiteborad to support user defined semantic relationships among objects" ACM Group, pp. 97-106, 2001.*

* cited by examiner

*Primary Examiner*—Anil Khatri
(74) *Attorney, Agent, or Firm*—Kilpatrick Stockton LLP

(57) ABSTRACT

A method, system, and computer program product for providing an application include representing a plurality of hierarchical rules as a plurality of objects in a prototype pointer chain, and providing a function to search the rules for a desired style by traversing the prototype pointer chain. An exemplary method provides a user interface or application with one or more visual objects. The visual appearances of the visual objects is affected by style information retrieved by traversing a prototype pointer chain to search for style-related rules. A compiled file can include code that describes rules as objects and creates class inheritance relationships between those objects and code that describes a style-finding function. A displaying program instantiates the objects arranged in a prototype pointer chain and uses its own inheritance logic to traverse the chain according to the style-finding function.

19 Claims, 3 Drawing Sheets

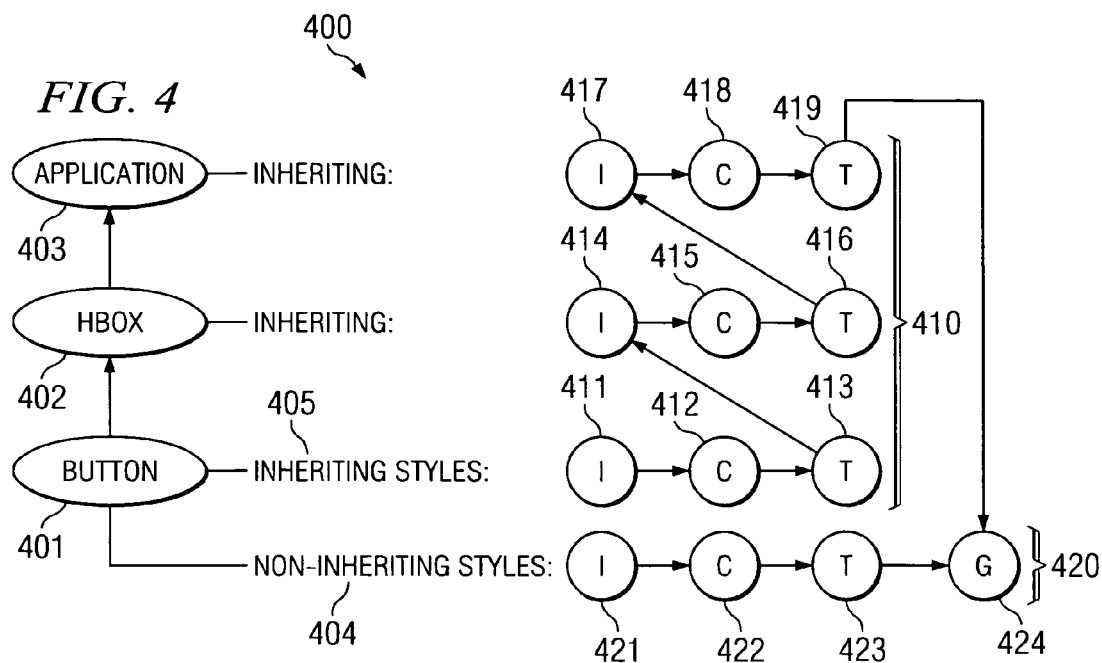
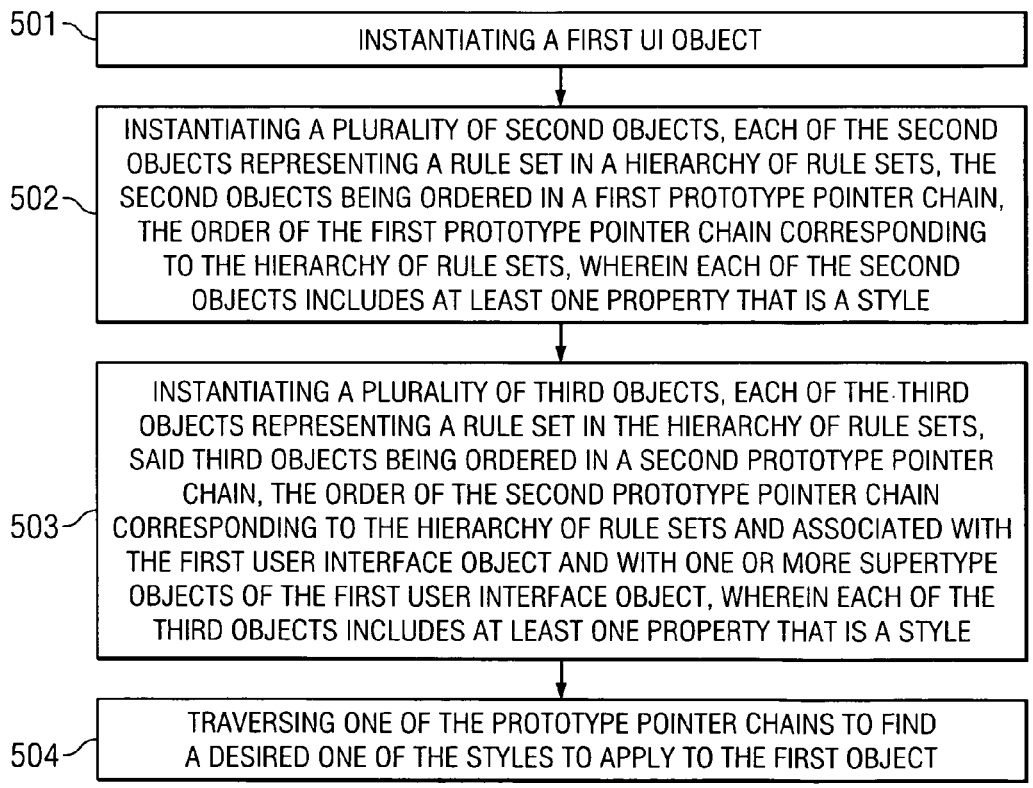

CASCADING STYLE SHEETS (CSS) PROTOTYPE POINTER CHAINING IN OBJECT-ORIENTED ENVIRONMENT

TECHNICAL FIELD

The present invention relates to visual object styles, and more specifically, to applying styles to objects during runtime.

BACKGROUND OF THE INVENTION

A variety of programs on the market allow a developer (e.g., a web developer) to create web pages, websites, interactive applications, and the like for use by end users (e.g., visitors to websites). Examples of such programs include DREAMWEAVER™ and FLEX BUILDER™, each available from MACROMEDIA INC. of San Francisco, Calif. DREAMWEAVER™ is an Integrated Development Environment (IDE) for creating Hypertext Markup Language (HTML) websites. FLEX BUILDER™ is an IDE for creating Rich Internet Applications (RIAs), and it uses MXML™ as its native development code for RIAs. RIAs are interactive, multimedia, applications, that may run on client-side players, for example, MACROMEDIA INC.'s FLASH™ player. MXML™ is an Extensible Markup Language (XML)-based language commonly used to create RIAs and it looks similar in some ways to HTML. A developer may write code in a text editor or FLEX BUILDER™ and save the MXML™ file to a FLEX™ server. The FLEX™ server compiles the code, including MXML™ and ACTIONSCRIPT™ code, into a file, such as a ShockWave Flash (SWF or "Small Web Format") file, that can be downloaded and executed on a user's machine. ACTIONSCRIPT™ code, available from MACROMEDIA INC, is a scripting language that is similar to JAVASCRIPT™ in that both ACTIONSCRIPT™ and JAVASCRIPT™ are based on the ECMA-262 standard.

FIG. 1 is an illustration of example system 100, adapted to provide a RIA to an Internet user. System 100 includes server 101 with compiler functionality, network 102, downloaded file 103, and user computer 104 with client application 105. Client application 105 in this example, is a FLASH™ player or FLASH™ player plug-in for a web browser. A developer builds a RIA that includes a UI and saves it in an MXML™ file on server 101. When a user at computer 104 requests the RIA, server 101 accesses the MXML™ file and compiles it into SWF (commonly pronounced "swiff") file 103. SWF file 103 contains, among other things, compiled ACTIONSCRIPT™ in the form of bytecodes. SWF file 103 is downloaded by client application 105 over network 102 for display to the user.

FLEX™ provides a way to generate SWF file 103. As explained above, a developer may open FLEX BUILDER™ or a text editor, create a document with MXML™ tags, and save the file to server 101, which is running the FLEX™ server. The FLEX™ server includes a compiler that compiles the saved MXML™ code into SWF file 103. SWF file 103 is then run, for example, on client application 105 that is enabled with a FLASH™ player plug-in. FLASH™-based applications are known for graphics and animation, and the appearance of the graphics is due, in large part, to styles applied to the UI objects.

Cascading Style Sheets (CSS) is a language that is often used in HTML web pages to apply styles to visual objects. CSS was developed in an attempt to separate style formatting from structure formatting and content. In a general sense, styles usually affect the visual appearance of an object, and include, for example, color and font size, whereas structure formatting usually specifies the objects and arrangement thereof on a user's screen. Just as HTML web pages utilize CSS, applications created with MXML™ also make use of CSS to apply style formatting. For any given object in an HTML or MXML™ document, several styles may apply. Accordingly, CSS provides a hierarchy of rule sets to determine which styles actually control how the object is rendered, as explained more fully below.

CSS code to implement a rule set that all buttons have a font size of twenty is illustrated in the following example:

Button {font-size:20}

The code in the example above automatically applies the rule set to all button objects in a particular application. It is referred to as a type rule set or type rule.

Other example code includes the following:

.mystyle {color:red}

Such code is referred to as a class rule set or class rule, and this specific class rule set applies a rule that a given object is rendered red. A style in a class rule set may apply to one or more objects, including button objects. An example portion of MXML™ code to produce a button object is as follows:

<mx:Button stylename="mystyle" background-color="blue"/>

Assuming that the type rule set above is in the same document as the button, its style rule is applied to the button. However, in order to apply the class rule set to the button, "stylename=mystyle" is included in the MXML™ code that describes the button.

A third way to apply styles through CSS is illustrated by the background color property in the MXML™ code above. The background color rule is referred to as an inline style or inline rule. This particular background color style only applies to this particular button, and is not shared by other buttons. It should be noted that according to the CSS standard, type rules, class rules, and global rules are properly referred to as respective "rule sets," while inline rules are properly referred to as "inline styles" for convenience. The term "rules" is used herein generically in the context of inline styles class rule sets, type rule sets, and global rule sets. Accordingly, the terms "in line rule," "class rule," "type rule," and "global rule," are understood to encompass respective styles or rule sets.

The above examples illustrate the different ways that styles may be applied to an object—background color is applied using an inline style, color is applied using a class rule set, and font size is applied using a type rule set. When a user's player, such as client application 105, encounters an event that causes it to have to search for the specific rule that applies a font size to the button above, it must determine which rule sets to look at and in what order to look. Further, the font size could be specified using an inline style, class rule set, and type rule set (although that is not the case in this example), so the client application know which particular style applies.

FIG. 2 illustrates exemplary hierarchy 200 of rules used by the client application 105 (FIG. 1) executing SWF file 103. When searching for the value of a style, client application 105 (FIG. 1) looks at inline rules 201 first. If client application 105 finds the particular style that it is looking for in inline rules 201, it looks no further. Accordingly, inline rules 201 take precedence over other rule sets 202-204 when the same style is defined in multiple places.

If client application 105 does not find the particular style in inline rules 201, it then goes to class rules 202. If client application 105 finds the style in class rules 202, it looks no further and applies the style, but if the particular style is not found in the class rules, it moves on to type rules 203. Accordingly, class rules 202 are below inline rules 201 in hierarchy 200, but are above type rules 203 and global rule set 204. If the particular style is not found in inline rules 201, class rules 202, or type rules 203, client application 105 moves on to global rules 204. Thus, as described above, client application 105 traverses hierarchy 200 until it finds the style that it is looking for.

The searching mechanism described above is implemented in script—in this case, compiled ACTIONSCRIPT™ bytecodes in SWF file 103. SWF file 103 is coded so that whenever the style-finding method is called, bytecodes specify that client application 105 should look at inline rules 201 first, class rules 202 second, type rules 203 third, and global rules 204 last. Accordingly, calling the style-finding method invokes hundreds of lines of bytecodes. Such a large amount of code may result in slow operation when applying styles during runtime, and slow operation may make the application less enjoyable or less appealing to end users.

BRIEF SUMMARY OF THE INVENTION

One or more embodiments of the present invention implement the style-finding method using prototype pointers rather than lines of script. When compiling a file, an application server includes code in the file that describes rules as objects and creates class inheritance relationships between those objects. The rules objects are described such that global rules are supertypes of type rule objects. Type rule objects are supertypes of class rule objects, and class rule objects are supertypes of inline rule objects. The supertype relationships operate to form a prototype pointer chain that corresponds to the hierarchy of rules. Code in the compiled file also describes a style-finding function that is a method of user interface object classes.

The displaying program instantiates the objects, arranged in the prototype pointer chain, and uses its own inheritance logic to traverse the prototype pointer chain, according to the style-finding function. Whereas previous solutions implemented the style-finding function in hundreds of lines of script to specify the order of the rules, various embodiments of the invention replace the hundreds of lines with as few as a single line. For this reason, traversing a prototype pointer chain may be hundreds of times faster than executing a large number of lines of script. Therefore, styles may be applied much more quickly than in the script-based approach.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

FIG. 4 illustrates two exemplary prototype pointer chains for applying CSS styles to a button object;

FIG. 5 is a flowchart that illustrates an exemplary method that may be performed by a program for rendering a RIA, according to one embodiment.

DETAILED DESCRIPTION OF THE INVENTION

Figure 3:
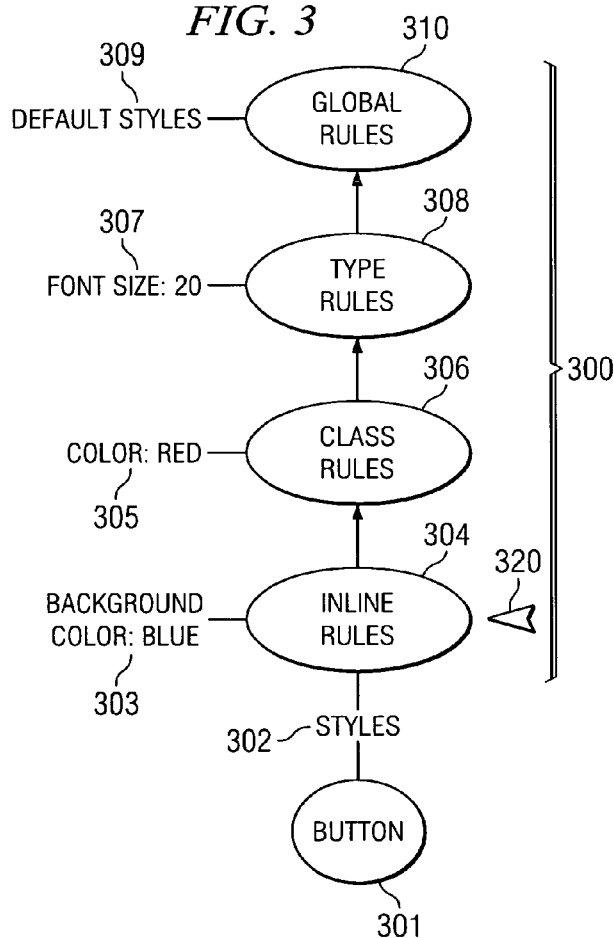
FIG. 3 is an illustration of an exemplary prototype pointer chain, adapted according to one embodiment of the invention.

FIG. 3 is an illustration of exemplary prototype pointer chain 300, adapted according to one embodiment of the invention. FIG. 3 shows an exemplary runtime scenario based on the MXML™ and CSS code described in the previous example. The button declared in the MXML™ code above is instantiated as button 301 at runtime. Button 301 has a property called "styles" 302. The value of styles property 302 is another object, namely inline rule object 304. Object 304 has a set of properties on it that include the inline styles for button 301. In this example, background color 303 is included as a property of inline rules 304. In other words, in this example, button 301 has background color property 303, the value of which is blue. Object 306 includes the styles defined in the class rules for button 301 that include color property 305. Type rule object 308 includes font size property 307. Finally, global rule object 310 includes a set of default style properties 309.

When a SWF file is compiled, the FLEX™ compiler converts the developer's code into ACTIONSCRIPT™ bytecodes. In other words, the CSS rules are converted into bytecodes that, when executed, instantiate objects that correspond to the rules, and the values of the properties of those objects are the styles.

Further, the compiler also inserts bytecodes in the SWF file which will be executed once the application starts running on the client application. These bytecodes, or "initialization code," are responsible for creating relationships between the objects that contain inline rules, the objects that correspond to class rules, and the objects that correspond to type rules. In particular, the initialization code creates class inheritance relationships, or "supertype/subtype relationships," between those objects. The class inheritance relationships are created by setting the objects' prototype pointers. For example, the initialization code sets the prototype pointer of inline rule object 304 to refer to class rule object 306. Once the prototype pointer is set, inline rule object 304 becomes a subtype of class rule object 306 (or, conversely, class rule object 306 becomes a supertype of inline rule object 304). Likewise, global rule object 310 is a supertype (i.e., prototype or parent) of type rule object 308, which is a supertype of class rule object 306. Taken together, the rule objects 304, 306, 308, and 310 are arranged in prototype pointer chain 300 in an order that corresponds to CSS hierarchy 200 (FIG. 2) described earlier.

In object-oriented programming (OOP) languages, such as C++, which provides the functionality of the FLASH™ player, a programmer may define an object type as a class and then create subclasses based on that class. For example, a programmer may define a class called "shape," which has properties and methods that are specific to shapes. Shape may have a method called "draw," a property called "position," and/or a property called "width." The programmer may then define subclasses of shape that are specific to particular types of shapes. For instance, a subclass of shape may include an object called "rectangle." Because rectangle is a subclass, it inherits the properties of its supertype, shape. Therefore, rectangle has a position property, a width property, and a draw method. In addition, rectangle may also have other properties that are specific to rectangle.

At runtime, if a program (such as, for example, a FLASH™ player) has a pointer to a rectangle object and asks the rectangle for its width property, the program first looks to the rectangle object to see if it has a width property. If the rectangle, itself, does not have a width property, then the program follows the prototype pointer to the supertype-shape. The program then asks shape if it has a width property. In this example, the program traverses a prototype pointer chain to search for the width property.

Prototype pointer functionality is built into the C++ code of many programs, including the FLASH™ player of this example. It should also be noted that any program incorporating ACTIONSCRIPT™ or JAVASCRIPT™ includes the prototype pointer concept. For example, Internet Explorer, available from Microsoft Corporation, and FIREFOX®, available from Mozilla Foundation, are examples of web browsers that each have an implementation of JAVASCRIPT™. ACROBAT READER®, available from Adobe Systems Incorporated, is an example of another browser plug-in which supports a JAVASCRIPT™-like language that includes prototype-pointer based inheritance. DREAMWEAVER™, an IDE, also has support for JAVASCRIPT™. In addition, other languages exist that use prototype chains as a basis for the object model. A non-exhaustive list includes LOGTALK™, which uses chains constructed from proto pointers.

Figure 1:
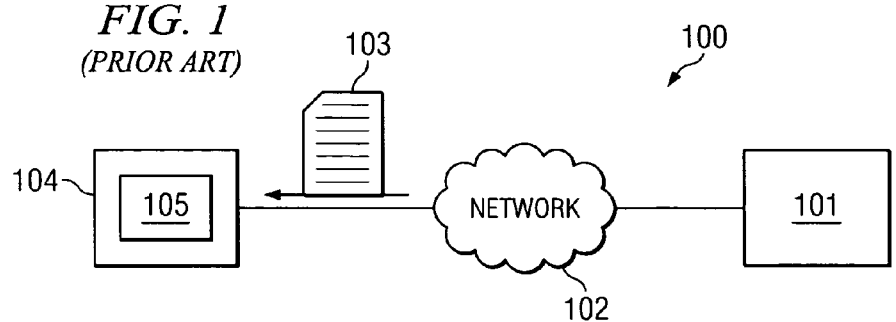
FIG. 1 is an illustration of an exemplary system, adapted to provide a RIA to a web user.
Figure 2:
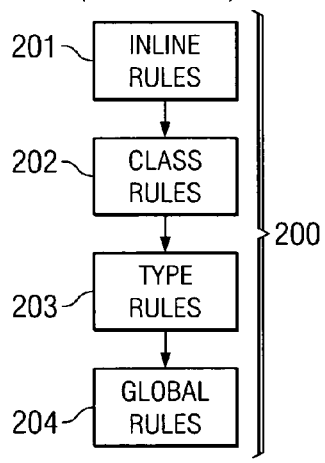
FIG. 2 illustrates an exemplary hierarchy of rules.

In the example of FIG. 3, when a "getStyle" method is called on a font size property, pointer 320 in the executing client program initially is set to refer to inline rule object 304. The program looks at object 304 and determines that it does not include the desired property. The program then updates pointer 320 to refer to class rule object 306. The program then determines that object 306 does not include a font size property. Once again, the program updates pointer 320 to refer to type rule object 308, and the program looks at object 308 and determines that the desired property is included therein. Accordingly, the program traverses prototype pointer chain 300 in the same manner as it traversed CSS rule hierarchy 200 (FIG. 2). However, the functionality described in FIG. 3 is implemented in a few dozen lines of C++, using the OOP concept of objects, as opposed to the previous method described in FIG. 2 that is implemented in many lines of ACTIONSCRIPT™.

Therefore, the embodiment of FIG. 3 "fools" the executing program into applying CSS styles using the class inheritance mechanism of ACTIONSCRIPT™ implemented by the FLASH™ player, which is written in C++. An advantage of some embodiments of the present invention is that it can use logic that is built into the executing program to replace the slow style-applying method that is otherwise implemented in ACTIONSCRIPT™. This may provide benefits in that prototype lookups are usually much quicker than the ACTIONSCRIPT™ bytecode execution described earlier. Faster application of styles may provide the RIA with a much more instantaneous and fluid feel that is more pleasing to a user. Another advantage is that the ACTIONSCRIPT™ that included hundreds of lines can be reduced to very few lines in the embodiment of FIG. 3 by defining a getStyle method as:

```
function getStyle(prop:String):Object
{
    return isInheriting(prop) ?
    inheritingStyles[prop]:
    nonInheritingStyles [prop];
}
```

In a particular example, the new functionality is provided in a library of ACTIONSCRIPT™ code in the application server. When compiling files to send to the client application, the application server includes bytecodes to initialize the prototype pointer chain and to cause the objects of FIG. 3 to be instantiated, and the code includes the getStyle function. Specifically, a parent user interface object (in ACTIONSCRIPT™, "UIObject") may be declared as a class in the library, with specific types of objects, such as Buttons, as subclasses (or subclasses of subclasses, etc.) declared also. The getStyle method is defined as a method on the user interface object class, and is inherited by the subclassses. The getStyle method is also included in the library of the application server. A developer then codes the application by creating various specific objects for the UI. The developer may also include ACTIONSCRIPT™ in the application to make the application interactive, such as by including script that changes at least part of the UI when a Button is clicked. The server then compiles the file to be downloaded, including the library code with the class declaration user interface objects and getStyle method. The compiled code also includes code that describes the various rule sets as objects, and it includes the initialization code that will organize those objects in a prototype pointer chain. When the client application renders the content from the file, it executes the code, initializing the prototype pointer chain. The objects in FIG. 3 are instantiated, with styles being applied through traversal of the prototype pointer chain.

FIG. 3 illustrates an example set of objects instantiated when applying CSS styles through traversing a prototype pointer chain. However, the application of CSS styles is more complicated in the majority of applications because the CSS standard designates some styles as inheriting and some as non-inheriting. In the context of CSS, "inheriting" refers to a property that is passed from a parent object to a child object. Example MXML™ code to produce parent and child objects may include the following:

```
<mx: Application>
    <mx: HBox color="green">
    <mx: Button/>
    <mx: Label/>
    </mx: HBox>
</mx: Application>
```

In the example code above, Application is a parent object of HBox, and both Button and Label are child objects of HBox. An inline rule for HBox declares that its color is green. Further, because color is an example of an inheriting style in the CSS standard, color applies not only to the HBox but to all the children, grand children, great grand children, and the like of the HBox. When the application is run, HBox will be colored green, as will Button and Label.

When the getStyle method searches for a color property for Button, it looks at inline rules, class rules, and type rules, and when it does not find the color property there, it must look at the properties for HBox, beginning at the inline rules. While FIG. 3 describes a four-step process, the reality for many applications is that applying a single style to a single object may include many more than four steps, depending on the inheriting styles in one or more parent objects. Had color been specified for Application, rather than for HBox, getting the color style for Button might require looking at the rule sets for Button, HBox, and Application. Had color not been specified in the code above, then getStyle would go to global rules after searching in the rules for Application. Thus, it would be more accurate to say that FIG. 3 applies to non-inheriting styles.

FIG. 4 illustrates two exemplary prototype pointer chains 410 and 420 for applying CSS styles to button object 401. As in the code above, Application 403 is a parent of HBox 402, which is a parent of Button 401. Button 401 has a property called "nonInheritingStyles" 404 and another property called "inheritingStyles" 405. This is analogous to dividing styles object 302 (FIG. 3) into two different properties-one for inheriting styles and one for non-inheriting styles. An example of an inheriting style is color, and an example of a non-inheriting style is marginLeft. The code in the file to be downloaded, when executed, is operable to cause non-inheriting styles to be assigned to the objects along prototype pointer chain 420 and to cause inheriting styles to be assigned to the objects along prototype pointer chain 410.

The value of non-inheriting styles property 404 is another object, namely inline rule object 421. Object 421 has a set of properties that include the inline styles for button 401. After the prototype pointer for object 421 is initialized at application startup, class rule object 422 is a supertype of inline rule object 421. Type rule object 423 is a supertype of class rule object 422, and global rule object 424 is a supertype of type rule object 423. Getting the value of a style in prototype pointer chain 420 is similar to that in chain 300 (FIG. 3).

Getting the value of an inheriting style in prototype pointer chain 410 is slightly different from that of chain 420. Inline rule object 414 is a supertype of type rule 413, and inline rule object 417 is a supertype of type rule object 416. Accordingly, when searching for a style property in prototype pointer chain 420, a program traverses objects 411-413, then traverses objects 414-416, then traverses objects 417-419, and finally searches global rule object 424 if the desired style is not found earlier.

FIG. 5 is a flowchart that illustrates exemplary method 500 that may be performed by a program for rendering a RIA, according to one embodiment. In step 501, the program instantiates a first object that is part of the UI of the RIA. The object may be any of a variety of objects that are part of a user interface, such as containers, buttons, grids, and the like. Further, the program may be any program capable of rendering an application for a user. For example, the program may be a web browser that renders HTML and is JAVASCRIPT™-enabled. Other examples include systems that employ XML/CSS/JAVASCRIPT™ and SVG/CSS/JAVASCRIPT™. Still further, the program may be a FLASH™ client, a browser with a FLASH™ plug-in, and the like.

In step 502, the program instantiates a plurality of second objects, each of the second objects representing a rule set in a hierarchy of rule sets. An example of a hierarchy of rule sets for CSS is shown in FIG. 2. Ways of implementing styles other than CSS may include different hierarchies, and are within the scope of embodiments. The second objects are ordered in a prototype pointer chain, and the order of the prototype pointer chain corresponds to the hierarchy of rules. In one example, rules lower in the rule hierarchy (e.g., type rules are lower than class rules) are represented as supertype objects of rules higher in the hierarchy (e.g., type rule objects are supertypes of class objects). Further, styles are represented as properties of the rule objects, as shown in FIG. 3. Step 502 may also include executing initialization code to initialize the prototype pointer chain, as described above.

In some cases, an object may not have a styleName property. In that case, no class rule may apply. Similarly, an object may have no inline rules or no type rules. In those cases, various embodiments do not manufacture empty objects to insert in the prototype chain. Instead, the program simply skips over the missing object and refers to the next object in the chain. If the object has no class rule set, for example, then the prototype pointer of the inline rule object will refer directly to the type rule object.

In step 503, the program instantiates a plurality of third objects. Each of the third objects represents a rule in the hierarchy of rules, the third objects being ordered in a second prototype pointer chain. Examples of first and second prototype pointer chains are illustrated in FIG. 4. The order of the second prototype pointer chain corresponds to the hierarchy of rules and is associated with the first user interface object and with one or more supertype objects of the first user interface object. Because the second prototype pointer chain is associated with the first UI object and with supertypes of that object, it can be a chain for inheriting properties, and the first prototype pointer chain can be for non-inheriting properties. Each of the third objects includes at least one property that is a style.

In step 504, the program traverses one of the prototype pointer chains to find a desired style to apply to the first object. For example, if the program is searching for a color to apply to the first UI object, it may traverse the second prototype pointer chain, since color is an inherited property. On the other hand, if the program is searching for marginLeft or marginRight, it may traverse the first prototype pointer chain, since margins are non-inherited properties. The program may traverse the entire length of a given prototype pointer chain, including a global rule object, before it finds the desired style.

Although method 500 is shown as a series of steps, it is merely exemplary, and other methods with different steps or a different order are within the scope of various embodiments. For example, another embodiment may perform step 503 at the same time or before it performs step 502. Other embodiments may also add or omit steps from method 500, such as, for example, instantiating only one prototype pointer chain.

While the examples above use prototype pointer functionality in C++ to implement one or more steps of method 500, various embodiments are not limited to C++. Any suitable program that includes code from a computer language with pointers that follow a chain of parent and child objects may be used.

As mentioned above, an advantage of some embodiments is that styles are applied much more quickly than in embodiments that go through hundreds of lines of ACTIONSCRIPT™ to perform the same function. Another advantage of some embodiments is that the functionality is implemented during compiling, such that it is transparent to the developer, i.e., the developer does not have to change the way he or she writes applications.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 6:
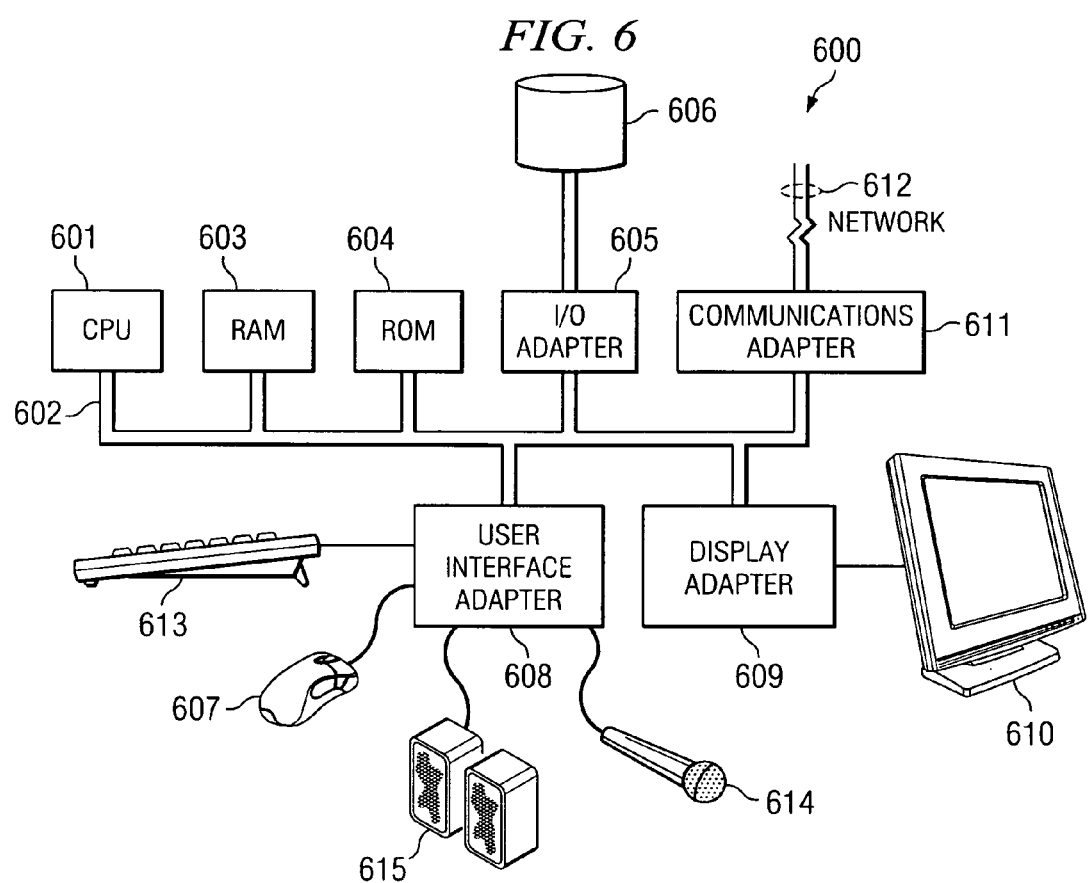
FIG. 6 illustrates an example computer system, adapted according to embodiments of the present invention.

FIG. 6 illustrates example computer system 600 adapted according to embodiments of the present invention. That is, computer system 600 comprises an example system on which embodiments of the present invention may be implemented. Central processing unit (CPU) 601 is coupled to system bus 602. CPU 601 may be any general purpose CPU. However, the present invention is not restricted by the architecture of CPU 601 as long as CPU 601 supports the inventive operations as described herein. CPU 601 may execute the various logical instructions according to embodiments of the present invention. For example, CPU 601 may execute machine-level instructions according to the exemplary operational flows described above in conjunction with FIG. 5.

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold user and system data and programs, as is well known in the art.

Computer system 600 also preferably includes input/output (I/O) adapter 605, communications adapter 611, user interface adapter 608, and display adapter 609. I/O adapter 605, user interface adapter 608, and/or communications adapter 611 may, in certain embodiments, enable a user to interact with computer system 600 in order to input information, such as, for example, entering MXML™ code.

I/O adapter 605 preferably connects to storage device(s) 606, such as one or more of hard drive, compact disc (CD) drive, floppy disk drive, tape drive, etc. to computer system 600. The storage devices may be utilized when RAM 603 is insufficient for the memory requirements associated with storing data for program 603. Communications adapter 611 is preferably adapted to couple computer system 600 to network 612 (e.g., the Internet). User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, display a working space or canvas to a developer or display a rendered application to a user.

It shall be appreciated that the present invention is not limited to the architecture of system 600. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer-implemented method comprising:
   representing a plurality of hierarchical rules as a plurality of objects in a prototype pointer chain;
   providing a function to search said rules for a desired style by traversing said prototype pointer chain; and
   processing via a processor instructions stored on computer-readable storage medium to provide a user interface comprising a visual object wherein a visual appearance of the visual object is affected by the desired style; wherein said hierarchy of rules is defined in Cascading Style Sheets (CSS) standard; and wherein said objects in said prototype pointer chain include a first object representing said type rule, said first object being a supertype of a second object, said second object representing said class rule, said second object being a supertype of a third object, said third object representing said inline rule.

2. The method of claim 1 wherein said hierarchy of rules is defined in Cascading Style Sheets (CSS) standard.

3. The method of claim 1 wherein said desired style is a property of an object in said plurality of objects.

4. The method of claim 1, wherein said function to search is a method of a user interface object in said application.

5. The method of claim 1 wherein traversing said prototype pointer chain includes searching a first object in said plurality of objects for a property of said first object corresponding to said desired style, if said desired style is not found, searching a second object in said plurality of objects for a property of said second object corresponding to said desired style, said second object being a supertype of said first object.

6. The method of claim 1 wherein said representing and said providing comprise compiling first code into second code, said first code describing user interface objects and styles applicable to said user interface objects, said second code operable, when executed, to initialize said prototype pointer chain and to instantiate said objects and said user interface objects and to perform said function to search.

7. The method of claim 1 further comprising representing a second plurality of hierarchical rules as a second plurality of objects in a second prototype pointer chain, wherein said prototype pointer chain is associated with non-inheriting styles, and wherein said second prototype pointer chain is associated with inheriting styles.

8. A computer-implemented method comprising:
   receiving first code, said first code describing a first object and rules applying to said first object, said rules in a hierarchy of rules;
   compiling said first code into second code, said second code describing a plurality of styles as properties of a plurality of second objects, each of said second objects representing one of said rules, said second objects being ordered in a prototype pointer chain, the order corresponding to the hierarchy of rules, said second code describing a method to find a desired style of said first object by traversing said prototype pointer chain; and
   processing, via a processor, instructions stored on computer-readable medium to provide a Rich Internet Application (RIA) comprising a visual object, wherein a visual appearance of the visual object is affected by the desired style wherein said hierarchy of rules is defined in Cascading Style Sheets (CSS) standard; and wherein said objects in said prototype pointer chain include a first object representing said type rule, said first object being a supertype of a second object, said second object representing said class rule, said second object being a supertype of a third object, said third object representing said inline rule.

9. The method of claim 8 further comprising:
receiving a user request for a Rich Internet Application;
downloading said second code to a client program in response to said request.

10. The method of claim 8 wherein said first code comprises code from a markup language, and wherein said second code comprises bytecodes.

11. The method of claim 8 wherein said prototype pointer chain is associated with styles defined by Cascading Style Sheets as non-inheriting, said second code further describing a plurality of inheriting styles as properties of a plurality of third objects, said third objects being ordered in another prototype pointer chain.

12. The method of claim 8 wherein ones of said second objects are supertype of other of said second objects, and wherein traversing said prototype pointer chain comprises searching one of said second objects for said desired style, and if said desired style is not found, searching a supertype of said one of said second objects.

13. A computer program product having a computer readable storage medium having computer program logic recorded thereon for providing a user application, comprising:
code to instantiate a first object and a second object, said first object to be rendered as part of a User Interface (UI) of said application;
code to apply a property to said first object that encompasses a plurality of styles of said first object, the value of said property being said second object, said second object being a first rule, the properties of said second object being styles applicable to affect a visual appearance of said first object;
code to instantiate a third object, said third object being a superclass of said second object, the properties of said third object being other styles applicable to affect the visual appearance of said first object, wherein said second and third objects represent hierarchical rules; and
code to call a method of said first object, said method instructing a program to inspect said second and third objects for said styles and said other styles by traversing a prototype pointer chain that includes said second and third objects comprising code to instantiate a fourth object in said prototype pointer chain, said fourth object being a superclass of said third object, wherein said second object corresponds to an inline rule, said third object corresponds to a class rule, and said fourth object corresponds to a type rule.

14. The computer program product of claim 13 further comprising code to apply another property to said first object that encompasses inheriting styles of said first object.

15. The computer program product of claim 14 further comprising code to instantiate a second prototype pointer chain associated with said inheriting styles.

16. The computer program product of claim 14 further comprising code to initialize said prototype pointer chain.

17. A computer-implemented method comprising:
instantiating a first user interface (UI) object;
instantiating a plurality of second objects, each of said second objects representing a rule in a hierarchy of rules, said second objects being ordered in a prototype pointer chain, the order of said prototype pointer chain corresponding to the hierarchy of rules, wherein each of said second objects includes at least one property that is a style;
traversing said prototype pointer chain to find a desired one of said styles to apply to said first object; and
processing, via a processor, instructions stored on computer-readable storage medium to render an application comprising the first UI object, wherein a visual appearance of the first UI object is affected by the desired style instantiating a plurality of third objects, each of said third objects representing a rule in said hierarchy of rules, said third objects being ordered in a second prototype pointer chain, the order of said second prototype pointer chain corresponding to said hierarchy of rules and associated with said first user interface object and with one or more supertype objects of said first user interface object, wherein each of said third objects includes at least one property that is a style; and traversing said second prototype pointer chin to find a desired style to apply to said first object.

18. The method of claim 17 wherein said prototype pointer chain corresponds to non-inheriting properties of said first object.

19. The method of claim 17 wherein said second prototype pointer chain corresponds to inheriting properties of said first object.

* * * * *